Feb. 5, 1924.

M. L. WEISS 1,482,494

AUTOMOBILE HOOD CATCH OR FASTENING THEREOF

Filed May 25, 1923

WITNESSES
Alex Davis
Dolores M. Rozenbaum

Max L. Weiss
INVENTOR

Patented Feb. 5, 1924.

1,482,494

UNITED STATES PATENT OFFICE.

MAX L. WEISS, OF BROOKLYN, NEW YORK.

AUTOMOBILE HOOD CATCH OR FASTENING THEREOF.

Application filed May 25, 1923. Serial No. 641,382.

*To all whom it may concern:*

Be it known that I, MAX L. WEISS, a citizen of the United States, residing at 325 Washington Street, in the county of Kings, city of New York, and State of New York, have invented a certain new and useful Improvement in Automobile Hood Catches or Fastenings Thereof, of which the following is a specification.

This invention relates to improvements in automobile hood catches or fastenings for automobile hoods. The object of the invention is to provide an improved automobile hood catch and handle combined and means of supporting and fastening or securing the same to the automobile and which will overcome some of the objections in such devices as now found.

The constant traveling of automobiles, particularly over rough roads, sometimes causes the automobile hoods to loosen from the present catches or so-called fastenings. The object of this invention is to provide an improved fastening for securing the automobile hood to the chassis of the automobile by means of an improved catch and handle combined.

The objects are set forth more particularly and made apparent in the specifications and the accompanying drawings in which Fig. 1 represents a front view of the catch attached to the hood;

Fig. 5 represents a rear or back view of the catch showing the spring hereinafter referred to.

The numerals refer to similar elements and parts in the several drawings.

Figure 1:
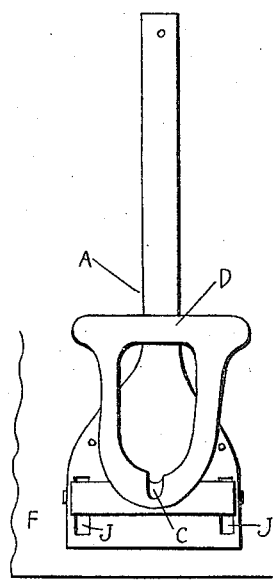

Hinged and attached to the lower panel of the inside or outside of the hood F and slightly above the lower edge thereof and projecting outwardly through a hole or opening therefrom and bent to a shape similar to that of the hood, is the catch A provided with a handle D adapted to be easily grasped when raising or closing the hood. The catch A is provided with a cup, socket or space C as shown in Fig. 1.

The tongue or rod B is attached to and carried upon the main frame of the chassis G of the automobile. The tongue or rod B is provided with a ball E affixed at the upper end and when the hood is brought down to a closing position the ball E of the tongue or rod B snaps and fits into the space or socket C thereby holding the hood of the automobile securely closed and fastened, locking the hood F to the chassis G of the car. The ball E is on a rod or tongue B which is provided with a spring I allowing the necessary movement and play when in operation.

The catch A and the tongue or rod B may be attached or affixed to the respective parts of the automobile by means of screws or other manner of securely binding them in positions as stated.

Figure 2:
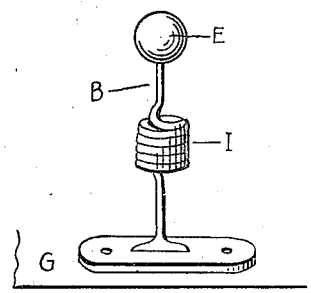
Fig. 2 represents a front view of the tongue or rod with a ball affixed on top thereof, attached to the chassis of the automobile.
Figure 3:
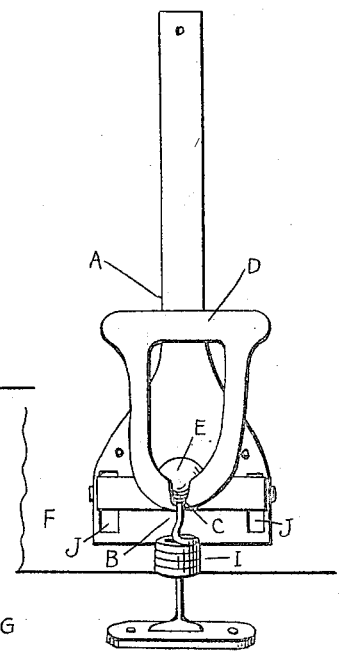
Fig. 3 represents a front view showing the combination of the catch and the tongue or rod, and showing the improved means for securing the hood in place when in a closed position.
Figure 4:
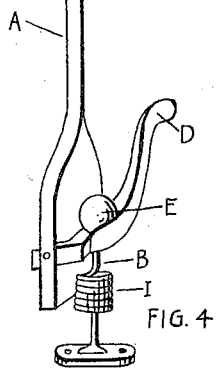
Fig. 4 represents a side view of the catch and tongue or rod in a fastened position as in Figure 3.
Figure 5:
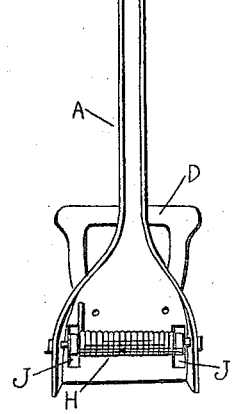

The tongue or rod B rises upwardly from the frame of the chassis G as shown in Figures 2, 3 and 4, and the ball E snaps into the socket or space C securely holding the hood in a fastened and closed position. The catch A is provided with a torsional spring H and recess or openings J which permit proper and necessary movement and motion in opening and closing the catch, and also aid in holding the hood securely closed when in that position, and also allow proper yielding when the handle D is used to raise the hood. The torsional spring H gives sufficiently to permit such movement and at the same time keeps the hood in a closed position when so desired.

The back or rear portion of catch A may be so constructed as to lie flush with the hood panel and is made of steel or other hard metallic substance, and when the hood is closed the said construction will permit the ball of the tongue or rod to slide into the space or socket, as aforesaid.

I do not intend to limit or restrict my form to that shown and described, as the same is shown in more or less particularity and I do not wish to be unduly restricted to the form shown and described beyond the scope of the appended claim.

What I claim is:

An automobile hood catch which is attached to the hood of the automobile and provided with a handle and torsional spring to allow necessary movement, a socket and a tongue or springy rod which is attached to and carried upon the chassis of the automobile, provided with a ball affixed at the upper end of said tongue or rod which ball when the hood is in a closed position snaps and fits into the socket or space, thereby holding the automobile hood securely closed and fastened, and locking the hood to the chassis of the automobile.

In witness whereof, I have hereunto subscribed my name.

MAX L. WEISS.

Witnesses:
 ALEX DAVIS,
 DOLORES M. ROSENBAUM.